(12) United States Patent
Saccomanno et al.

(10) Patent No.: US 7,075,100 B2
(45) Date of Patent: Jul. 11, 2006

(54) CONFOCAL SCANNER SYSTEM AND METHOD

(75) Inventors: Robert J. Saccomanno, Montville, NJ (US); Ivan B. Steiner, Ridgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/947,082

(22) Filed: Sep. 22, 2004

(65) Prior Publication Data
US 2005/0061999 A1    Mar. 24, 2005

Related U.S. Application Data

(60) Provisional application No. 60/504,878, filed on Sep. 22, 2003.

(51) Int. Cl.
*G03B 42/08* (2006.01)
(52) U.S. Cl. .................................. 250/584
(58) Field of Classification Search ............. 250/584
See application file for complete search history.

(56) References Cited

U.S. PATENT DOCUMENTS

| | | |
|---|---|---|
| 3,013,467 A | 12/1961 | Minsky |
| 3,859,527 A | 1/1975 | Luckey |
| 4,258,264 A | 3/1981 | Kotera et al. |
| 4,591,714 A | 5/1986 | Goto et al. |
| 4,741,993 A | 5/1988 | Kano et al. |
| 4,844,617 A | 7/1989 | Kelderman et al. |
| 5,028,509 A | 7/1991 | Shimada et al. |
| 5,091,652 A | 2/1992 | Mathies et al. |
| 5,153,767 A | 10/1992 | Makino |
| 5,168,386 A | 12/1992 | Galbraith |
| 5,198,655 A | 3/1993 | Suetsugu et al. |
| 5,208,459 A | 5/1993 | Morrone et al. |
| 5,218,461 A | 6/1993 | Aoyama et al. |
| 5,340,661 A | 8/1994 | Van Havenbergh et al. |
| 5,434,431 A | 7/1995 | Verbeke et al. |
| 5,459,325 A | 10/1995 | Hueton et al. |
| 5,548,126 A | 8/1996 | Exelmans et al. |

(Continued)

FOREIGN PATENT DOCUMENTS

WO    WO 01/03156 A1    1/2001

OTHER PUBLICATIONS

Chang, C.M. and Han-Ing D. Shieh; "Design of illumination and projection optics for projectors with single digital micromirror devices"; 2000 Optical Society of America; Applied Optics, Jul. 1, 2000, vol. 39, No. 19, pp. 3202-3208.

(Continued)

*Primary Examiner*—David Porta
*Assistant Examiner*—Marcus Taningco
(74) *Attorney, Agent, or Firm*—Kurt Luther; James W. Falk (57) ABSTRACT

A radiation image that has been stored in an image plate (19), such as a photostimulable phosphor screen is read by stimulating an information-bearing target area (13) with stimulating light (1). The information bearing target area responds to this stimulation by emitting information-bearing light (2) and reflecting backscatter light (3). The combination (4) of information-bearing light and backscatter light is collimated, allowing efficient rejection of backscatter light. The information-bearing light is subsequently focused onto an information receiving target (17), such as a charge-coupled device (CCD).

22 Claims, 6 Drawing Sheets

U.S. PATENT DOCUMENTS

| | | | |
|---|---|---|---|
| 5,552,922 | A | 9/1996 | Magarill |
| 5,637,867 | A * | 6/1997 | Schroder et al. ............ 250/234 |
| 5,747,796 | A | 5/1998 | Heard et al. |
| 5,768,028 | A | 6/1998 | Okamura |
| 5,886,354 | A | 3/1999 | Leblans |
| 5,930,433 | A | 7/1999 | Williamson et al. |
| 5,953,308 | A | 9/1999 | Yokota et al. |
| 6,009,065 | A | 12/1999 | Glushko et al. |
| 6,133,986 | A | 10/2000 | Johnson |
| 6,228,286 | B1 | 5/2001 | Leblans et al. |
| 6,231,199 | B1 | 5/2001 | Li |
| 6,232,611 | B1 | 5/2001 | Suzuki et al. |
| 6,355,938 | B1 | 3/2002 | Cantu et al. |
| 6,357,878 | B1 | 3/2002 | Sawamura |
| 6,366,365 | B1 | 4/2002 | Williamson |
| 6,414,760 | B1 | 7/2002 | Lopez et al. |
| 6,420,724 | B1 | 7/2002 | Struye et al. |
| 6,445,483 | B1 | 9/2002 | Takada et al. |
| 6,479,835 | B1 | 11/2002 | Struye et al. |
| 6,495,850 | B1 | 12/2002 | Struye et al. |
| 6,501,088 | B1 | 12/2002 | Struye et al. |
| 6,504,169 | B1 | 1/2003 | Leblans et al. |
| 6,507,032 | B1 | 1/2003 | Hell et al. |
| 6,507,039 | B1 | 1/2003 | Gebele et al. |
| 2002/0167723 | A1 | 11/2002 | Eda et al. |
| 2003/0038249 | A1 | 2/2003 | Hackenschmied et al. |
| 2003/0071228 | A1 | 4/2003 | Bergh et al. |
| 2005/0029475 | A1* | 2/2005 | Katz .......................... 250/589 |

OTHER PUBLICATIONS

Freiherr, Greg; "Battle of the Detectors Defines Future of DR Market"; Digital Radiography; Swissray International; http://www.diagnosticimaging.com/DR/battle.shtml printed Mar. 17, 2003.

Leblans, Paul Jr.; Peter Willems, Leo B. Alaerts; "New Needle-Crystaline Dettector for X-ray Computer Radiography (CR)"; 8th ECNDT, Barcelona, Jun. 2002; http://www.ndt.net/article.ecndt02/44/44.htm; printed Feb. 24, 2003.

Schaetzing, Ralph Ph. D.; "Computed Radiographic Technology"; RSNA 2000 Special Course: Digital Radiography—Acquisition Technologies 125A. Computed Radiography Acquitsition Technologies.

Schaetzing, Ralph Ph. D.; "New High-Speed Scanning Technique for Computed Radiography"; 2002 SPIE; Proceedsing of SPIE vol. 4682; pp. 511-520.

CCD Area Image Sensor S7033/S7034 Series; Product Specification; Image Sensor; Hamamatsu Photonics K.K. Solid State Division.

CCD Area Image Sensor S7030/S7031 Series; Product Specification; Image Sensor; Hamamatsu Photonics K.K. Solid State Division.

"Choosing A Microscope"; www.edmundoptics.com.

Mitutoyo Infinity-Corrected Long Working Distance objectives; www.edmundoptics.com.

"Tandem Systems"; Linos Optical Systems.

Nonius DIP2000 User Manual; www.nonius.com/dip2000/manuals/dip2000users/DIPUser1.html.

Roithner Lasertechnik RLT 6830G Technical Data "High Power Visible Wavelength Laserdiode".

* cited by examiner

CONFOCAL SCANNER SYSTEM AND METHOD

CROSS-REFERENCE TO RELATED APPLICATIONS

This application is based on U.S. Provisional Application Ser. No. 60/504,878 entitled "Confocal Scanner", filed on Sep. 22, 2003, the teachings of which are incorporated herein by reference.

BACKGROUND OF THE INVENTION

1. Technical Field

This invention relates to radiation image recording systems wherein a radiation image is recorded on a photostimulable phosphor screen.

2. Background Art

Any discussion of the prior art throughout the specification should in no way be considered as an admission that such prior art is widely known or forms part of common general knowledge in the field.

A recorded image, such as an X-ray, can be reproduced by stimulating an exposed photostimulable phosphor screen by means of stimulating radiation and by detecting the light that is emitted by the phosphor screen upon stimulation and converting the detected light into an electrical signal representation of the radiation image. There exists in the prior art various scanners for use in reading an image from a stimulable phosphor plate; for example Exelmans (U.S. Pat. No. 5,548,126) describes a scanner for use in a digital radiography system. As discussed in Exelmans, a certain type of phosphor can be energized to an excited state by exposure to X-rays, and then can be stimulated by visible or infrared light (i.e. light of a first sense) to emit visible light in the blue region of the spectrum (i.e. light of a second sense). Other separate senses of light such as polarization state can be used in lieu of wavelength to discriminate between stimulation and emission light.

Typically, light emitted by the phosphor screen upon stimulation is detected by means of an array of charge coupled devices. The light, which is used for stimulating the phosphor screen, has to be separated from the light emitted by the screen upon stimulation.

In order to capture the image stored within the phosphor, one must capture the light of the second sense without contaminating it with backscatter light of the first sense. One possible way to avoid such contamination is to use the decay-time of the phosphor to discriminate, via gating, between the two light senses described above. However, as discussed in Leblens (U.S. Pat. No. 6,228,286), reliance on decay-time, can limit the throughput of digital radiography system.

One issue with a wavelength based system is the need to maximize signal-to-noise ratio (S/N), and therefore requiring the rejection, such as by filtering, of backscatter light in the stimulation wavelength band while maximizing the amount of light captured in the desired emission wavelength band. For example, Struye (U.S. Pat. No. 6,495,850) states that the optical density of the filter at the stimulation wavelength range should be at least 8 while the transmission at the emission wavelength should be higher than 75%. Therefore, there is a tendency, in the prior art, to separate the stimulation and emission wavelength bands to accommodate such characteristics as the filter roll-off.

While this helps in discrimination, it complicates the optical system due to dispersion effects, such effects are discussed in *Modern Optical Engineering*, W. J. Smith, ISBN 0-07-136360-2. In an optical scanner, such as described in the specification below, such dispersion effects can result in uneven stimulation of an information bearing target area of the image plate and a reduction in quality of the information transferred from the image plate to an optical sensor. Struye further teaches that in order to maximize collection efficiency for an image scanner a large solid angle of the emission must be captured. However, allowing such a large solid angle to pass through an optical filter requires the use of absorptive rather than thin film coated filters, which poses significant materials challenges in meeting the emission wavelength transmission of 75% while rejecting the stimulating wavelengths at very high optical densities.

There exists a need for a scanning system for radiation image recording systems that can high provide a high collection efficiency of the emission wavelengths while rejecting a high degree of the stimulating wavelength.

SUMMARY OF THE INVENTION

The following summary of the invention is provided to facilitate an understanding of some of the innovative features unique to the present invention. A full appreciation of the various aspects of the invention can only be gained by taking the entire specification, claims, drawings, and abstract as a whole.

The present invention describes a system and method to provide a compact system for reading a radiation image that has been stored in a photostimulable phosphor screen wherein stimulation light and light emitted by the screen upon stimulation are optically separated. The present invention avoids undesirable optical dispersion effects by avoiding passing both the initial stimulation wavelengths and resultant emission wavelengths through a common refractive element having optical power, such as an imaging lens. To maintain high collection efficiency and a high degree of discrimination, the present invention utilizes a confocal optical arrangement, which can encompass a series of filters within the collimated space of this confocal arrangement.

According to a first aspect, the present invention is realized by a radiation information recording system comprising a source of light of a first sense, an information bearing target which receives the light of the first sense and in response thereto emits information bearing light of a second sense together with back scatter light of the first sense, wherein the light of the first sense and the information bearing light do not pass through a common reflective element having optical power, means for collimating the information bearing light of the second sense and the back scatter light of the first sense, means for separating the information bearing light of the second sense and the back scatter light of the first sense from the collimated light, an information receiving target, and means for focusing the separated information bearing light onto the information-receiving target.

According to a second aspect, the present invention is realized by a method for using stimulating light to stimulate an information bearing target area into releasing information bearing light and transferring the information bearing light to an information receiving target, wherein the initial stimulating light and the resultant information-bearing light do not pass through a common refractive element having optical power, the method comprising the steps of
receiving stimulating light of a first sense from a light source,
illuminating the information bearing target area with stimulating light, the illumination occurring about the normal of an image aperture coincident with a portion of the information-bearing target area,
receiving a combination of information bearing light of a second sense emitted from the information bearing target area in response to the illumination and backscatter light of the first sense reflected from the information-bearing target,
the information bearing light being of a second sense, and
the reception also occurring about the normal of the aperture,
collimating the combination of information bearing light and backscatter light to form a collimated combined light,
rejecting, in collimated space, the backscatter light portion from the collimated combined light,
recovering the information-bearing light, and
transferring the information bearing light to the information receiving target.

Further advantages and embodiments of the present invention will become apparent from the following description and drawings.

BRIEF DESCRIPTION OF DRAWINGS

The accompanying figures further illustrate the present invention.

BRIEF DESCRIPTION OF THE SEVERAL VIEWS OF THE DRAWING

LIST OF REFERENCE NUMBERS FOR THE MAJOR ELEMENTS IN THE DRAWING

The following is a list of the major elements in the drawings in numerical order.
1 stimulating light (of a first sense)
2 information bearing light (of a second sense)
3 backscatter light portion (of a first sense)
4 collimated combined light (contains both backscatter and target light)
5 collimated information bearing light (contains substantially only target light)
6 focused information-bearing light
11 light source (of stimulating light 1)
12 first parabolic reflector
13 information bearing target area
14 first beam-splitter
15 second beam-splitter
16 second parabolic reflector
17 information receiving target
19 image plate (e.g. photostimulable phosphor screen)
20 image aperture
21 normal to aperture (dashed line)
22 apertured collimating lens
23 first aperture (in collimating lens 22)
24 apertured first cold mirror
25 hot mirror
26 focusing lens
27 first cold mirror
30 second aperture (in second cold mirror 24)
31 coated lower prism
32 first hot mirror coating (lower prism 31)
41 coated upper prism
42 second hot mirror coating (upper prism 41)
43 third hot mirror coating (upper prism 41)
51 first tapered non-imaging optic
52 second tapered non-imaging optic
53 third tapered non-imaging optic
110 step of receiving stimulating light
120 step of illuminating information bearing target
130 step of receiving information bearing light (from target)
140 step of collimating information-bearing and backscatter light
150 step of rejecting backscatter portion of light emitted from target
160 step of recovering information-bearing light
170 step of transferring information bearing light to receiving target (without passing through refractive element)

DETAILED DESCRIPTION OF THE INVENTION

The present invention is designed for use with an X-ray scanner or similar device that modifies a image by subjecting that image plate to radiation wherein the modified image plate contains information that can be released by the application of stimulating light.

The following descriptions are intended to demonstrate the basic principal of operation of the present invention. As such, additional optical elements, such as relay lenses, may be used to further enhance image quality. Such elements are also discussed in *Modern Optical Engineering* and can be designed by one skilled in the art by using optical imaging analysis tools such as Code V from Optical Research Associates (Pasadena, Calif.).

Figure 1:
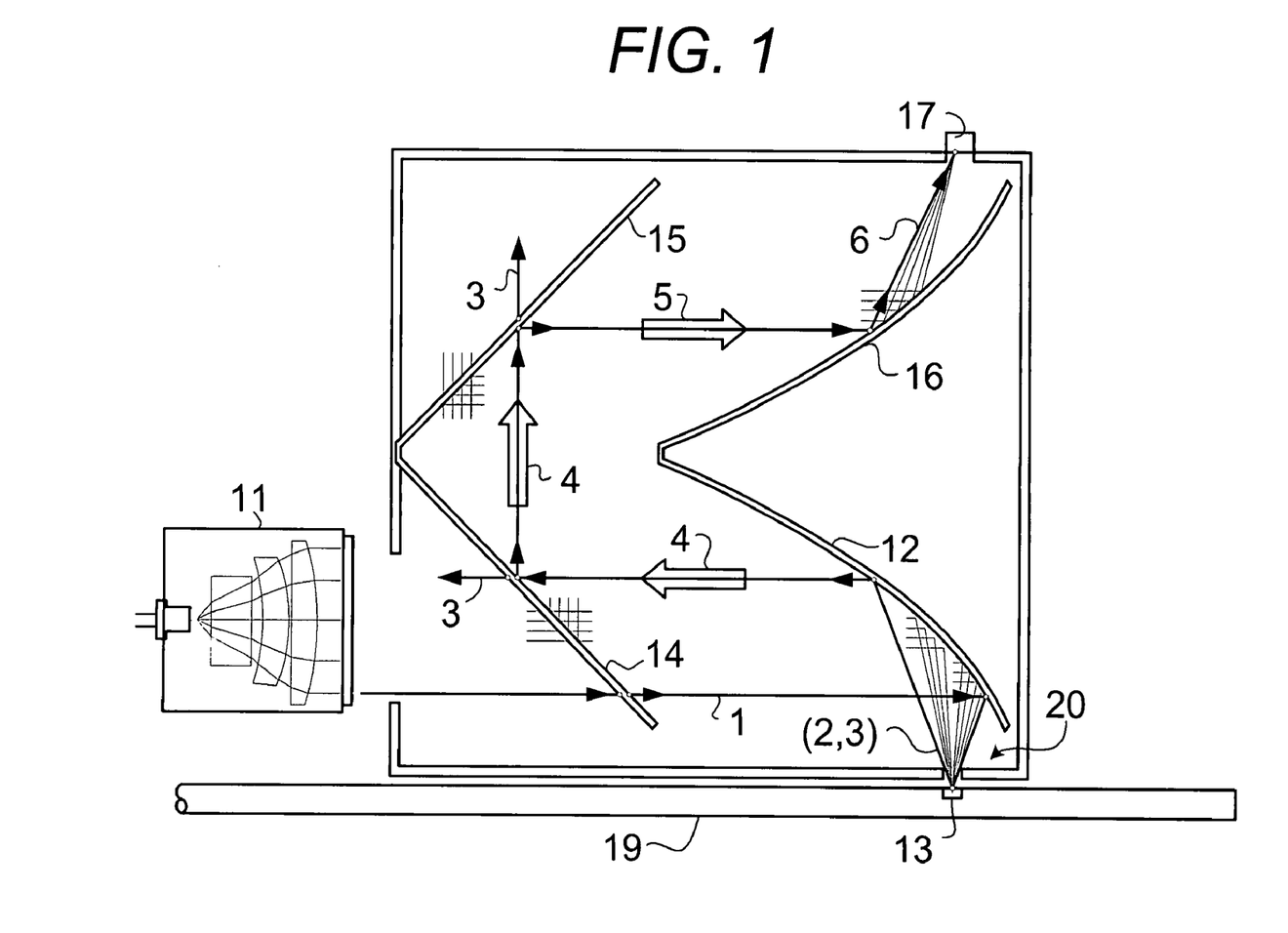
FIG. 1 shows a confocal scanner apparatus employing dual parabolic reflectors in accordance with one illustrative embodiment of my invention.

Referring first to FIG. 1, an illustrative all-reflective imaging apparatus suitable for my inventive method is shown. Stimulating light 1 of a first sense, such as red light, from a light source 11 strikes a first beam-splitter 14 which is configured to pass light of this first sense and reflect light of a second sense, such as blue light. In one illustrative embodiment of my invention, the beam-splitter 14 is a dichroic beam-splitter. After the stimulating light 1 passes through beam-splitter 14, it is reflected from a first parabolic reflector 12 through an image aperture 20 into an information-bearing target area 13, such as a pixel area on an image plate 19, where image plate 19 is preferably a photostimulable phosphor screen.

The information-bearing target area 13 responds to illumination by the stimulating light 1 by emitting information-bearing light 2 of the second sense, such as by fluorescing blue light. The information-bearing target 13 also reflects a portion of the stimulating light 1 as back-scatter light 3 of the first sense, where this back-scatter light 3 is mixed with the information-bearing light 2 as a combination which passes back through image aperture 20. The combination of information-bearing light 2 and backscatter light 3 reflects from first parabolic reflector 12 as collimated combined light 4. Collimated combined light 4 strikes first beam splitter 14 where a portion of the backscatter light 3 is separated from collimated combined light 4 as collimated combined light 4 is reflected from first beam-splitter 14 and directed toward second beam-splitter 15. Beam splitters 14 and 15 can comprise a dichroic mirror, such as those that may be available from Omega Optical (Brattleboro, Vt.).

Collimated combined light 4 then strikes second beam splitter 15 where substantially all of the remaining backscatter light 3 is separated from collimated combined light 4, resulting in collimated information bearing light 5 that contains substantially only target light being reflected from second beam-splitter 15. Collimated information bearing light 5 is then directed toward second parabolic reflector 16. Backscatter light 3, from said beam splitters 14 and 15, is preferably directed towards a blackened surface (not shown). Such surfaces are discussed in *Black Surfaces for Optical Systems*, Chapter 37, *Handbook of Optics*, ISBN 0-07-047974-7.

A first essential feature of my invention is that the combination of information-bearing light 2 and backscatter light 3 is collimated before the information-bearing light 2 is separated from backscatter light 3 in collimated space, advantageously enabling better performance of the beam splitters 14 and 15 as compared to the prior art, where a similar separation is performed in non-collimated space. One illustrative embodiment showing the separation of the information bearing light 2 from backscatter light 3 in collimated space has been described above.

Focused information bearing light 6 is recovered from collimated information bearing light 5 by the reflecting and focusing action of second parabolic reflector 16, where this focused information-bearing light 6 is directed to information receiving target 17, such as a charge-coupled device (CCD).

A second essential feature of my invention is that the initial stimulating light 1 and the information-bearing light 2 do not pass through a common refractive element having optical power. For example in the all-reflective illustrative embodiment shown above, the stimulating light 1 and the information-bearing light 2 commonly interact with first beam-splitter 14, first parabolic reflector 12 and image aperture 20, where none of these elements are refractive optical elements having optical power.

Figure 2:
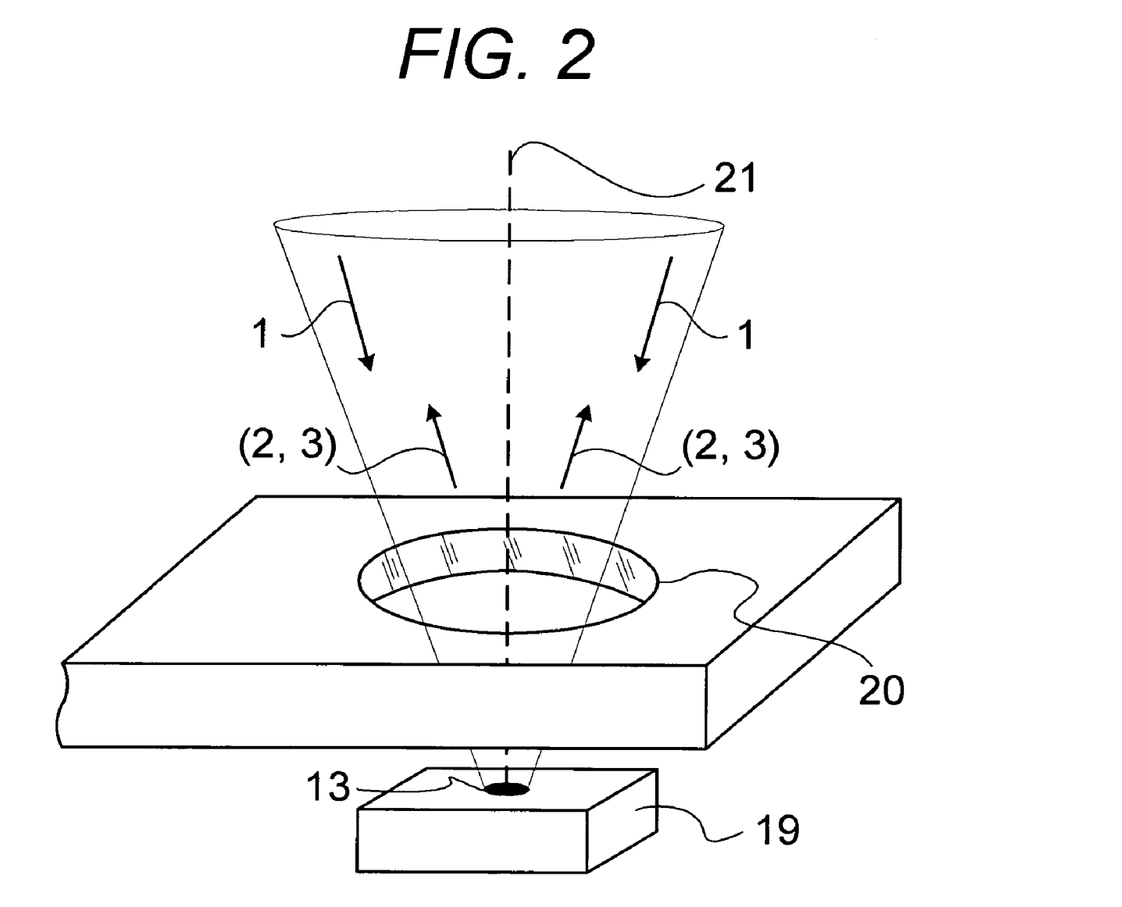
FIG. 2 shows additional detail for an aperture element of FIG. 1.

Referring now to FIG. 2 which illustrates additional detail of the image aperture element 20 shown in FIG. 1. As described previously, stimulating light 1 passes through image aperture 20, illuminating information-bearing target area 13 of image plate 19. As shown in FIG. 2, such illumination occurs about the normal 21 of the image aperture 20, where the image aperture 20 is coincident with the information-bearing target area 13. Note that such apertures are known in the art to maximize image quality, and apertures that may be suitable for use with the present invention may be available from Lenox Laser (Glen Arm, Md.).

In one preferred embodiment, image aperture has knife-edges in order to minimize unwanted reflections internal to the aperture. It is also advantageous to place the sharp edged hole as close as practical to information-bearing target area 13 thereby maximizing rejection of unwanted backscatter and information-bearing off-axis light from areas surrounding information-bearing target 13.

Also, as described previously, the information bearing target area 13 responds to the stimulating light 1 by emitting information-bearing light 2 and reflecting backscatter light 3. As shown in FIG. 2, such emission and reflection also occurs about the normal 21 of the image aperture 20, where the image aperture 20 is centered on the information-bearing target area 13.

Figure 3:
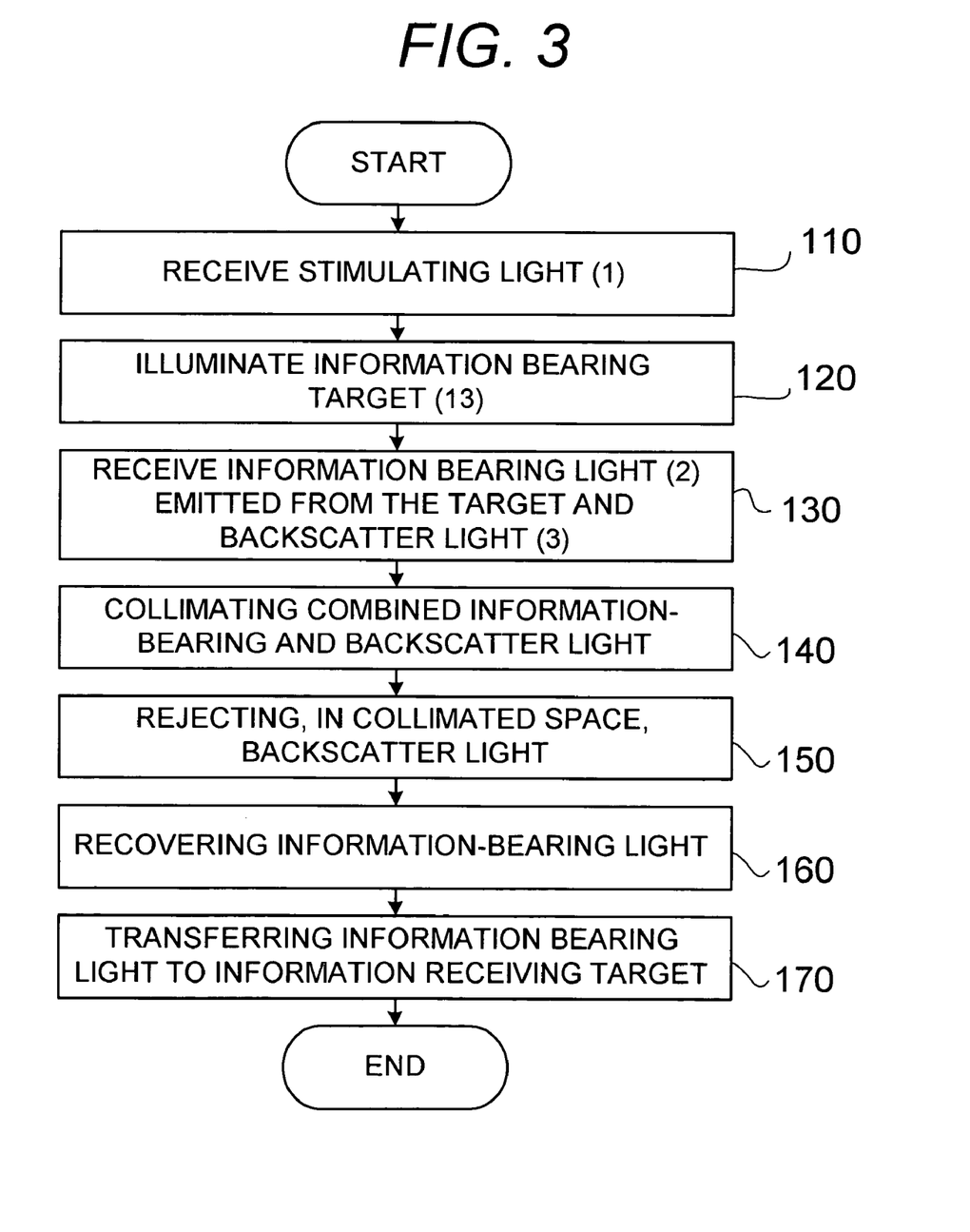
FIG. 3 illustrates a method of scanning a target using the apparatus of FIGS. 1 and 2.

Referring now to FIG. 3 and describing the inventive method steps of one embodiment of my invention in view of the illustrative apparatus of FIGS. 1 and 2. Stimulating light 1 of a first sense, such as red light, is received (step 110) from a light source 11. This stimulating light is directed to illuminate (step 120) an information bearing target area 13 of an image plate 19 where such illumination occurs about the normal 21 of an aperture coincident with the a portion of the information bearing target area 13.

The information bearing target area 13 responds to the stimulating light 1 by emitting information-bearing light 2 of a second sense, such as fluorescing blue light. This information-bearing light is received (step 130) about the about the normal 21 of the image aperture 20 centered on a portion of the information bearing target area 13. In addition to the information-bearing light 2 being emitted from the target area 13, a portion of the stimulating light 1 is reflected back through the image aperture 20 as backscatter light 3.

The combined information-bearing light 2 and backscatter light 3 is collimated (step 140) upon exiting the aperture, for example by reflection from the first parabolic reflector 12. The resulting collimated combined light 4 is then processed into collimated information bearing light 5 such as by reflection from and transmission through dichroic beam splitters to reject (step 150) backscatter light 3. Advantageously, this rejection of backscatter light is performed in collimated space, allowing for the use of very efficient filters.

Finally, the focused information-bearing light 6 is recovered (step 160) from the collimated information bearing light 5 and transferred (step 170) to an information receiving target 17, such as by the focusing action of said second parabolic reflector 16.

An added dimension of flexibility for a confocal scanning system, such as that illustrated in FIG. 1 above can be obtained through scanning the image plate using either macro-steps or micro-steps. For example, assuming that the confocal scanner system has just read the information residing within a target area on the information bearing target, a macro-step will move the aperture to a new location of a distance at least as great as the aperture size, while a micro-step will move a distance less than an aperture size. Macro-stepping can be used to very quickly obtain a gross image. On the other hand, micro-stepping can be used to provide detailed imagery—in the case of computed radiography, an increased resolution in an area of interest. Macro-stepping and micro-stepping methodology is similar to what is known in the art of ink-jet printing, such as is described in Hickman (U.S. Pat. No. 6,457,806). Such micro-stepping, in combination with a high quality image aperture and rapid translation across the information bearing target, can also eliminate the need for a line or area charge-coupled device (CCD), greatly simplifying the optical complexity and cost, while still providing high resolution scanning and throughput.

In applications of the present invention where the information receiving target 17 comprises a non-rectangular pixilated array, such as the type of arrays discussed in Shizukuishi (U.S. Pat. No. 6,717,190), it is desirable to match the shape of image aperture 20 at the information bearing target to the shape of the image sensor.

The system can also employ a number of image aperture 20 masks that can be selected into place to allow various resolution modes, for example, in the case of computed radiography, a finer aperture set can be also used to increase the resolution of an area of interest. Also, a plurality or array of confocal systems as taught in the present invention can be employed to increase image-scanning throughput.

It should be noted that for an all-reflective confocal scanner, such as shown in FIG. 1, those parabolic reflectors have larger off-axis aberrations than most refractive optical elements. Accordingly, it is preferred that the information bearing target area 13 be small and located centrally on the focal point of first parabolic reflector 12. Similarly, it is preferred that the information receiving target 17 be as small as practical and also be located centrally on the focal point of second parabolic reflector 16.

Figure 4:
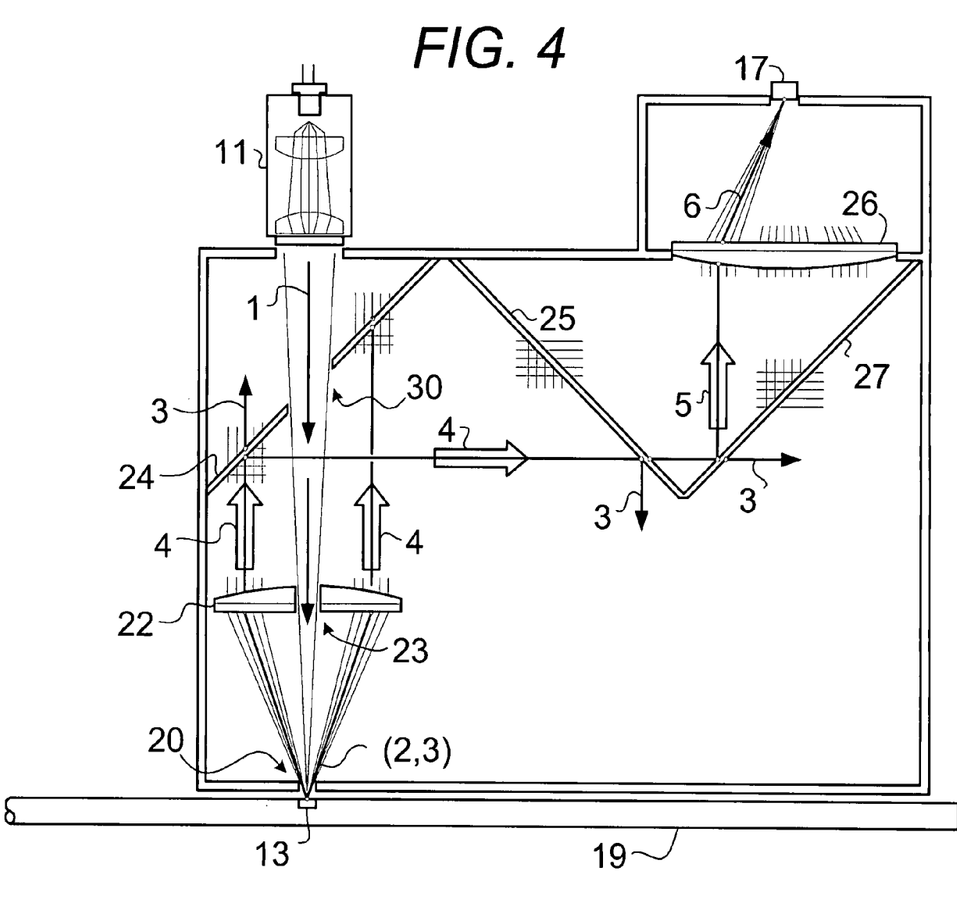
FIG. 4 shows a confocal scanner apparatus employing an apertured collimating lens and an apertured cold mirror in accordance with a second illustrative embodiment of my invention.

Referring now to FIG. 4, which shows a second confocal scanner configuration, using certain refractive optical elements, in accordance with the present invention. Focused stimulating light 1 of a first sense, such as red light, from a light source 11 passes through a second aperture 30, in apertured second cold mirror 24, continues through a first aperture 23, in apertured collimating lens 22, further continues through image aperture 20, and impinges on the information-bearing target area 13 on the image plate 19. The information-bearing target area 13 responds by emitting information-bearing light 2 combined with back-scatter light 3 where this combination which passes back through image aperture 20.

The combination of information-bearing light 2 and backscatter light 3 is collimated as it passes through apertured collimating lens 22, forming collimated combined light 4. Collimated combined light 4 strikes apertured second cold mirror 24 where a portion of the backscatter light 3 is separated from collimated combined light 4 as collimated combined light 4 is reflected from apertured second cold mirror 24 and directed toward hot mirror 25. Collimated combined light 4 passes through hot mirror 25, where another portion of the backscatter light 3 is removed by being reflected away, such as toward a red-beam dump (not shown). Next, collimated combined light 4 is reflected from first cold mirror 27 as collimated information bearing light 5, where substantially all backscatter light 3 has been removed.

Focused information bearing light 6 is recovered from collimated information bearing light 5 by the focusing action of focusing lens 26, where this focused information-bearing light 6 is directed to information receiving target 17.

Figure 5:
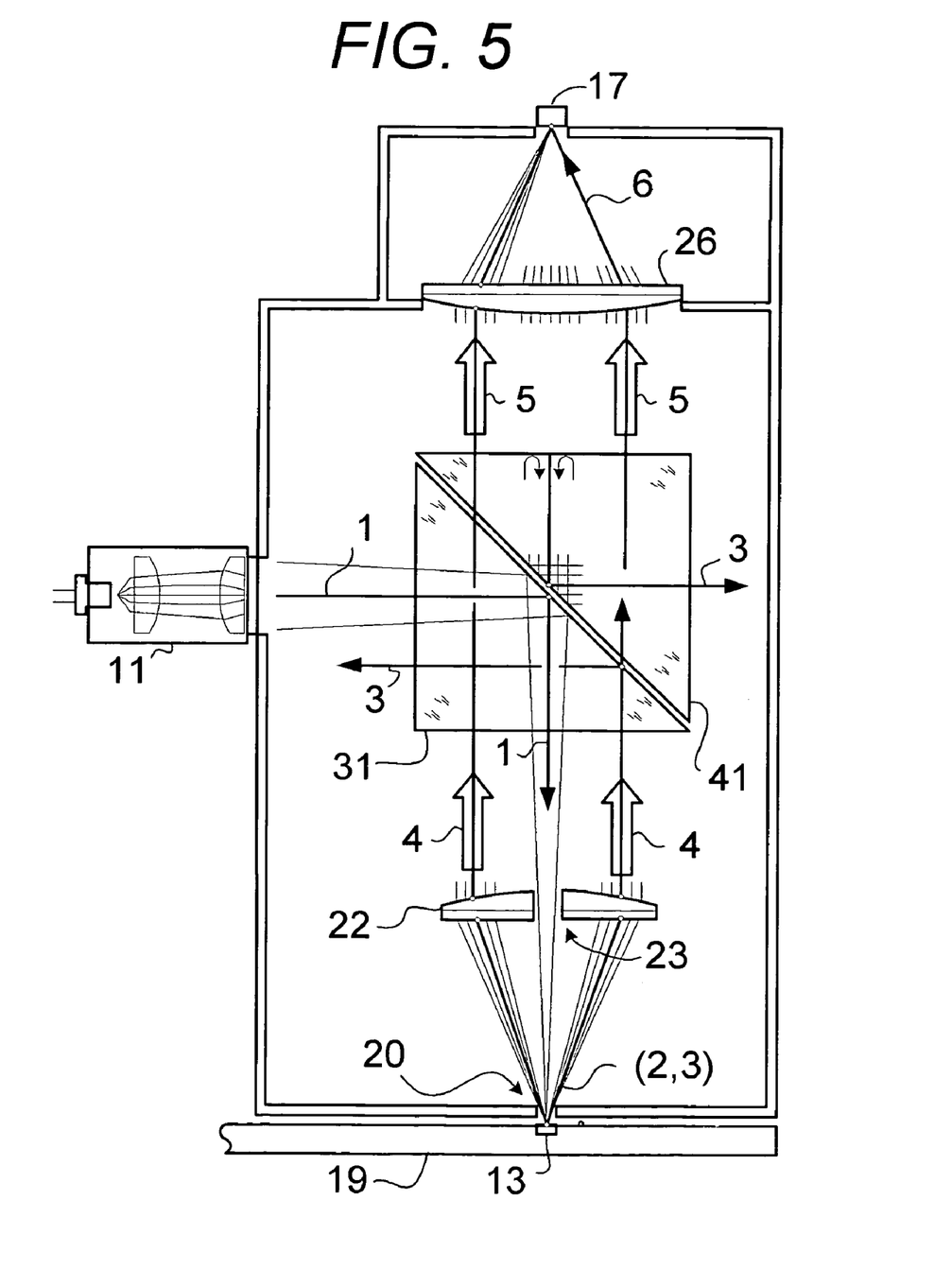
FIG. 5 shows a confocal scanner apparatus employing an apertured collimating lens and dual coated prisms in accordance with a third illustrative embodiment of my invention.
Figure 6:
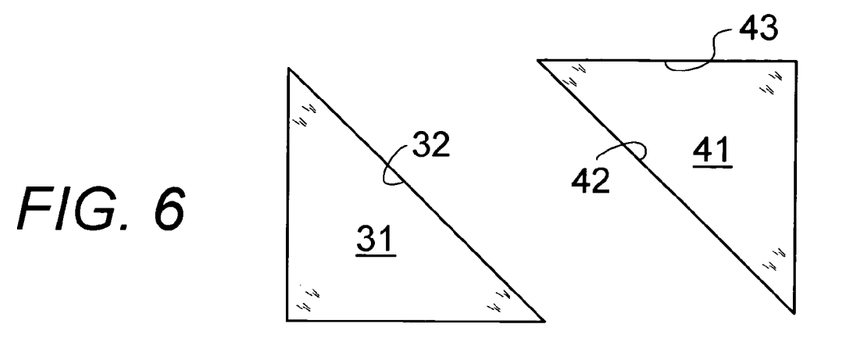
FIG. 6 illustrates additional detail for the dual coated prisms of FIGS. 5 and 7.

Refer now to FIGS. 5 and 6, which show a third illustrative confocal scanner configuration embodying my invention. Focused stimulating light 1 of a first sense, such as red light, from a light source 11 enters a coated lower prism 31 where it is reflected from a first hot mirror coating 32 and passes through the first aperture 23, in apertured collimating lens 22. Stimulating light 1 continues through image aperture 20, and impinges on the information-bearing target area 13 on the image plate 19. The information-bearing target area 13 responds by emitting information-bearing light 2 combined with backscatter light 3 where this combination passes back through image aperture 20.

The combination of information-bearing light 2 and backscatter light 3 is collimated as it passes through apertured collimating lens 22, forming collimated combined light 4. Collimated combined light 4 passes into a coated lower prism 31 where a portion of backscatter light 3 it is reflected away by first hot mirror coating 32, such as toward a red-beam dump (not shown). Collimated combined light 4 then passes into coated upper prism 41, where another portion of backscatter light is prevented from entering the upper coating prism by second hot mirror coating 42.

Collimated combined light 4 continues to pass though coated upper prism 41, impinging upon third hot mirror coating 43, which acts to remove substantially all backscatter light 3 so that the light exiting prism is collimated information-bearing light 5, which contains substantially only target light. Focused information bearing light 6 is recovered from collimated information bearing light 5 by the focusing action of focusing lens 26, where this focused information-bearing light 6 is directed to information receiving target 17.

Figure 7:
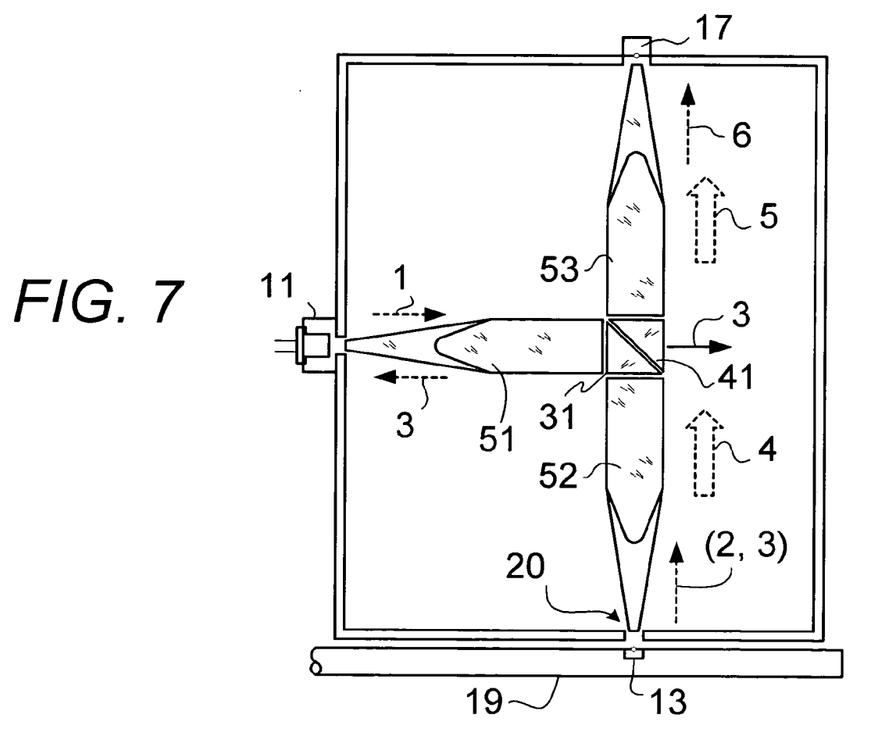
FIG. 7 shows a confocal scanner apparatus employing tapered non-imaging optics and dual coated prisms in accordance with a fourth illustrative embodiment of my invention.

Referring finally to FIG. 7 and continuing to refer to FIG. 6, a fourth illustrative confocal scanner configuration, using non-imaging optics, in accordance with my invention is shown.

Stimulating light 1 of a first sense, such as red light, from a light source 11 enters a first tapered non-imaging optic 51, where it is collimated. This collimated stimulating light 1 then enters coated lower prism 31 where it is reflected from a first hot mirror coating 32 and passes into a second tapered non-imaging optic 52, where it is reconcentrated. Stimulating light 1 exits from second tapered non-imaging optic 52, continues through image aperture 20, and impinges on the information-bearing target area 13 on the image plate 19. The information-bearing target area 13 responds by emitting information-bearing light 2 combined with back-scatter light 3 where this combination which passes back through image aperture 20.

The combination of information-bearing light 2 and backscatter light 3 is collimated as it passes through second tapered non-imaging optic 52, forming collimated combined light 4. Collimated combined light 4 passes into a coated lower prism 31 where a portion of backscatter light 3 it is reflected away by first hot mirror coating 32. Collimated combined light 4 then passes into coated upper prism 41, where another portion of backscatter light is prevented from entering the upper coating prism by second hot mirror coating 42.

Collimated combined light 4 continues to pass though coated upper prism 41, impinging upon third hot mirror coating 43, which acts to remove substantially all backscatter light 3 so that the light exiting prism is collimated information-bearing light 5, which contains substantially only target light. Focused information bearing light 6 is recovered from collimated information bearing light 5 by the concentrating action of third tapered non-imaging optic 53, where this focused information-bearing light 6 is directed to information receiving target 17.

Aperture 20 should be located at the snout end aperture of tapered non-imaging optical element 52 and in close proximity to target area 13. The gap between target area 13 and the snout end aperture should be made as small as practical to minimize the illuminated target area.

Similarly, the snout end aperture of tapered non-imaging optical element 53 should be located in close proximity to information receiving area 17. The gap between information receiving area 17 and the snout end aperture should be made as small as practical to minimize the illuminated information receiving area.

The housing clearance holes for the snout apertures of tapered non-imaging optical elements 52 and 53 can be a substrate formed from a thin sheet with apertures that match the snout apertures. By bringing the snout and sheet apertures in alignment with each other and in close proximity with targets 13 and 17, the resolution and image quality is maximized.

Alternatively, the holes in the housing adjacent to target area 13 and information receiving area 17 can be of a conical shape that matches the sides of tapered non-imaging optical elements 52 and 53. The aperture size of the conical housing holes can be made to match those of the conical end apertures of tapered non-imaging optical elements 52 and 53. The conical housing holes can engage the conical ends of tapered non-imaging optical elements 52 and 53 thereby providing a means of securing tapered non-imaging optical elements 52 and 53 in place. To prevent absorption at tapered non-imaging optical element contact areas, reflective film such as, for example, aluminum can be applied either to the conical end surfaces of tapered non-imaging optical elements 52 and 53 or to the conical housing apertures they engage. The same reflecting film application method alternatives can be implemented at other structural contact areas of tapered non-imaging optical elements 52 and 53 and of prisms 31 and 41. These contact areas, needed to secure these elements in position, should be minimized.

LIST OF ACRONYMS USED IN THE SPECIFICATION

The following is a list of the acronyms used in the specification in alphabetical order.

| CCD | charge-coupled device |
| --- | --- |
| LED | light emitting diode |

ALTERNATE EMBODIMENTS

Alternate embodiments may be devised without departing from the spirit or the scope of the invention. For example, while the embodiments above describe the two light senses as two wavelength bands of light, the invention can be fashioned to utilize any two senses of electromagnetic energy. In addition, the term "information" as used in "information bearing" can comprise images, such as in radiography or solid state photography images, data, the presence of a compound, such as in fluorescent tagging of DNA or luminescent security features in currency, or the exposure to radiation such as in radiation dosimetry. The term "information receiving" can be a projection screen or surface, the human eye, photographic film in the case of a projected image, or a photodiode or CCD in the case of radiography.

What is claimed is:

1. A radiation information recording system comprising:
   (a) a source (11) of light (1) of a first sense;
   (b) an information bearing target (13) which receives said light of said first sense and in response thereto emits information bearing light (2) of a second sense together with back scatter light (3) of said first sense, wherein said light of said first sense and said information bearing light do not pass through a common refractive element having optical power;
   (c) means for collimating (12) said information bearing light of said second sense and said back scatter light of said first sense;
   (d) means for separating (14) the information bearing light of said second sense and the back scatter light of said first sense from the collimated light (4);
   (e) an information receiving target (17); and
   (f) means for focusing (16) said separated information bearing light (6) onto said information-receiving target.

2. The radiation information recording system in accordance with claim 1 wherein said means for collimating comprises a parabolic reflector.

3. The radiation information recording system in accordance with claim 1 wherein said means for separating comprises at least one beam splitter which passes light of one of said first or second senses and reflects light of the other sense.

4. The radiation information recording system in accordance with claim 3 further comprising sequential first and second beam splitters.

5. The radiation information recording system in accordance with claim 1 wherein said means for focussing comprises a parabolic reflector.

6. The radiation information recording system in accordance with claim 1 further comprising:
   (a) sequential first and second beam splitters;
   and wherein (b) said means for collimating comprises a parabolic reflector; and
   (c) said means for focussing comprises a parabolic reflector.

7. The radiation information recording system in accordance with claim 1 wherein said means for collimating comprises a collimating lens.

8. The radiation information recording system in accordance with claim 7 wherein said light of said first sense is projected to said information bearing target through an aperture in said collimating lens.

9. The radiation information recording system in accordance with claim 1 further comprising:
   (a) a mirror that reflects light of one of said first or second senses and passes light of the other sense.

10. The radiation information recording system in accordance with claim 9 wherein said light of said first sense is projected to said information bearing target through an aperture in said mirror.

11. The radiation information recording system in accordance with claim 1 wherein said means for focusing comprises a focusing lens.

12. The radiation information recording system in accordance with claim 1 further comprising:
   (a) a mirror which reflects light of one of said first or second senses but passes light of the other said first sense;
   and wherein
   (b) said means for collimating comprises a collimating lens;
   (c) wherein said light of said first sense is projected to said information bearing target through an aperture in said collimating lens;
   (d) wherein said light of said first sense is projected to said information bearing target through an aperture in said mirror; and
   (e) said means for focusing comprises a focusing lens.

13. The radiation information recording system in accordance with claim 1 wherein:
(a) said means for collimating comprises a tapered non-imaging optical element.

14. The radiation information recording system in accordance with claim 1 wherein:
(a) said means for separating comprises a prism having a coating on a surface thereof,
  (i) said coating reflecting away at least a portion of said back scatter light of said first sense, and
  (ii) passing through said information bearing light of said second sense.

15. The radiation information recording system in accordance with claim 14 wherein:
(a) said means for separating further comprises a second prism having a coating on a surface therefor that reflects away said back scatter light of said first sense and passes said information bearing light of said second sense.

16. The radiation information recording system in accordance with claim 1 wherein said means for focusing comprises a tapered non-imaging optical element.

17. The radiation information recording system in accordance with claim 1 wherein said light of first sense is selected from the group consisting of: laser, light emitting diode, and short arc lamp.

18. The radiation information recording system in accordance with claim 1 wherein said information bearing target comprises a photostimulable material selected from the group consisting of: a phosphor, a fluorescent tagged element, a luminescent fiber, and a luminescent particle.

19. The radiation information recording system in accordance with claim 1 wherein said information bearing target comprises a photosensitive material selected from the group consisting of: semiconductor, projection screen, photographic film, and human eye.

20. The radiation information recording system in accordance with claim 1 wherein said information-bearing target is scanned via micro-stepping.

21. The radiation information recording system in accordance with claim 1 wherein said information-bearing target is scanned via macro-stepping.

22. The radiation information recording system in accordance with claim 1 further comprising an image aperture (20) in close proximity to said information bearing target, wherein said aperture having a shape selected from the group consisting of: circular, triangular, rectangular, arcuate, and polygonal, and a combination of arcuate and linear segments.

* * * * *